(12) United States Patent
Fiorentino et al.

(10) Patent No.: US 8,915,635 B2
(45) Date of Patent: Dec. 23, 2014

(54) BACKLIGHT HAVING DUAL COLLIMATING REFLECTORS

(71) Applicant: Hewlett-Packard Development Company, L.P., Houston, TX (US)

(72) Inventors: Marco Fiorentino, Mountain View, CA (US); David A Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 13/801,996

(22) Filed: Mar. 13, 2013

(65) Prior Publication Data
US 2014/0268867 A1    Sep. 18, 2014

(51) Int. Cl.
*F21V 7/04*    (2006.01)
*F21V 8/00*    (2006.01)

(52) U.S. Cl.
CPC .................................. *G02B 6/0031* (2013.01)
USPC ........................... 362/609; 362/610; 362/621

(58) Field of Classification Search
CPC .. G02B 6/0011; G02B 6/0013; G02B 6/0015; G02B 6/0016; G02B 6/0018; G02B 6/002; G02B 6/0023; G02B 6/0031; G02B 6/0033
USPC ........ 362/608, 609, 621–627; 349/61, 62, 63, 349/65, 67
See application file for complete search history.

(56) References Cited

U.S. PATENT DOCUMENTS

| | | | |
|---|---|---|---|
| 7,364,343 B2 * | 4/2008 | Keuper et al. | 362/628 |
| 7,619,604 B2 | 11/2009 | Karman et al. | |
| 8,132,952 B2 | 3/2012 | Ryu et al. | |
| 8,272,758 B2 | 9/2012 | Meir et al. | |
| 2012/0008067 A1 | 1/2012 | Mun et al. | |
| 2012/0063166 A1 * | 3/2012 | Panagotacos et al. | 362/609 |
| 2012/0182494 A1 | 7/2012 | Yu et al. | |

FOREIGN PATENT DOCUMENTS

| | | |
|---|---|---|
| EP | 0708351 | 4/1996 |
| JP | 6111779 | 4/1994 |

* cited by examiner

*Primary Examiner* — Thomas M Sember
(74) *Attorney, Agent, or Firm* — North Shore Associates; J. Michael Johnson

(57) ABSTRACT

A backlight to emit light from a surface thereof includes a light guide to guide light, first and second collimating reflectors and a light source to produce light. The first collimating reflector is at a first edge of the light guide to collimate the light from the light source in a vertical direction and to direct the collimated light into the light guide. The second collimating reflector is at a second edge of the light guide to further collimate the collimated light in a horizontal direction and to redirect the further collimated light back into the light guide.

15 Claims, 7 Drawing Sheets

BACKLIGHT HAVING DUAL COLLIMATING REFLECTORS

CROSS-REFERENCE TO RELATED APPLICATIONS

N/A

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDPs), liquid crystal displays (LCDs), electroluminescent (EL) displays, organic light emitting diode (OLED) and active matrix OLEDs (AMOLED) displays, electrophoretic (EP) displays and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given their lack of an ability to emit light.

To overcome various application-related limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1A:
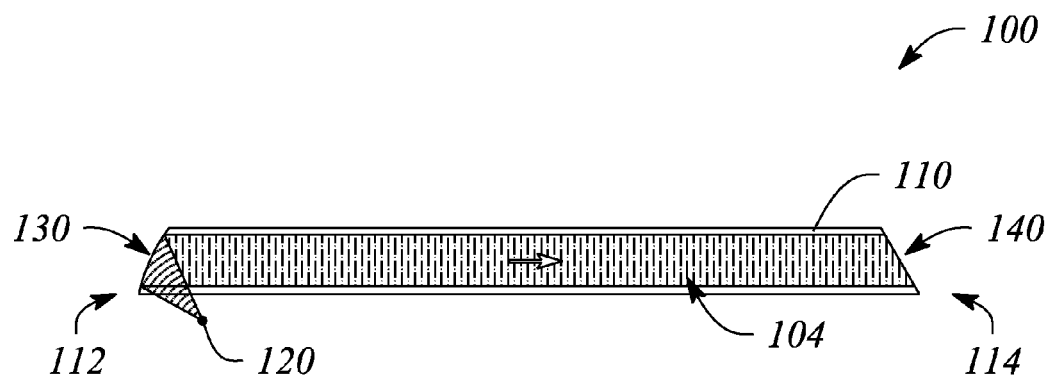
FIG. 1A illustrates a cross sectional view of a backlight, according to an example consistent with the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide backlighting that employs collimated light guided within a light guide. The backlighting may be used to illuminate an electronic display, for example. In particular, backlighting of an electronic display described herein employs a pair of collimating reflectors to collimate light from a substantially uncollimated light source. The collimated light produced by a first collimating reflector is directed into and guided within the light guide to a second collimating reflector of the pair. The second collimating reflector further collimates the guided light and according to some examples, additionally redirects the further collimated light back into the light guide at a non-zero angle relative to a surface of the plate light guide. In some examples, a portion of the redirected and further collimated light in the light guide may be coupled out using a diffraction grating to produce light for backlighting the electronic display. In other examples, other means including, but not limited to, anisotropic scattering may be employed to couple out the guided light. Backlighting in accordance with the principles described herein may be applicable to a variety of electronic display configurations including, but not limited to, two-dimensional (2-D) displays and three-dimensional (3-D) displays.

Herein, a 'collimating reflector' is defined as a reflector that accepts light and redirects or reflects the light as substantially collimated light. The light accepted by the collimating reflector may be substantially uncollimated, for example. According to various examples, collimated light produced by the collimating reflector may be collimated in a particular direction (i.e., a collimation direction). By definition, a 'collimation direction' is a direction generally orthogonal to a propagation direction of the light in which there is little or no divergence of the light. In particular, rays of collimated light viewed in the collimation direction are substantially parallel to one another, by definition herein.

In some examples, the collimating reflector may collimate light in a first direction but not in a second direction. For example, the light may be collimated in a vertical direction (e.g., perpendicular to a surface of a light guide) but not in a horizontal direction (e.g., parallel with the light guide surface). Rays of light in the vertically collimated light when viewed in a cross section taken in the vertical direction are substantially parallel to one another. However, rays of light in vertically collimated light when viewed in a horizontal cross section may not be parallel. As such, vertically collimated light may still exhibit divergence, and in some examples substantial divergence, in the vertical direction, for example, by definition herein. On the other hand, light collimated in two, substantially orthogonal directions may exhibit little or no divergence in any direction orthogonal to the propagation direction of the light and may be termed 'dual-collimated' light or simply a collimated light beam. In a collimated light beam, the light rays are all substantially parallel to one another regardless of the cross section direction in which the collimated light beam is viewed, by definition herein.

In some examples, the collimating reflector may be a portion of a parabolic cylinder. A parabolic cylinder reflector collimates reflected light in a direction generally perpendicular to a long axis of the cylinder, where the reflected light originates at a focal point of the parabolic cylinder reflector. In other examples, the collimating reflector collimates or otherwise changes a divergence of a beam of light in two directions that are substantially orthogonal to one another (e.g., parallel and perpendicular to a light guide surface). In some examples, the collimating reflector may further direct the collimated light at a non-zero angle. For example, instead of exiting the collimating reflector in a horizontal direction, the collimated light may propagate away from the collimating reflector at one or both of an angle $\theta$ measured from a horizontal axis or plane and an angle $\phi$ measured from a vertical axis or plane, for example. In some examples, the non-zero angle is achieved by tilting or canting the collimating reflector in one or both of the vertical plane and the horizontal plane.

In some examples, the collimating reflector may be a shaped reflector configured to collimate light in a first direction (e.g., a vertical direction) while producing a diverging beam of light in a second direction (e.g., a horizontal direction). In some examples, the collimating reflector is a shaped reflector having a surface defined by a solution to equation (1a)

$$\sqrt{x^2+y^2+z^2}=\sqrt{(x-x_0)^2+(z-z_0)^2}-c \quad (1a)$$

where x and y are in the vertical plane, z is in the horizontal direction orthogonal to the vertical plane, and c is scale factor. Coordinates $x_0$ and $z_0$ in equation (1a) represent a point of origin of a diverging beam produced by the shaped reflector defined by the equation. In particular, the diverging beam may appear to be produced by a point source located at a point $X=(x_0, z_0)$, for example. The scale factor c is two times a focal length f of the shaped reflector, in some examples.

In some examples, the collimating reflector may be a shaped reflector configured to further collimate light in a second direction (e.g., the horizontal direction) that is already collimated in the first direction (e.g., the vertical direction) and also is diverging from a point $X=(x_0, z_0)$, for example. Further, the shaped reflector also may be configured to redirect the further collimated light in a direction defined by polar angles $\theta$ and $\phi$, where $\theta$ is measured from an x-axis in an x-y plane and $\phi$ is measure up from the x-y plane toward a z-axis. In particular, in some examples, the collimating reflector may be a shaped reflector having a surface defined by a solution to equation (1b)

$$\sqrt{(x-x_0)^2+(z-z_0)^2+(z-z_0)^2}=x \cdot \cos\theta \cos\phi+z \cdot \cos\theta \sin\phi+y \cdot \sin\theta-c \quad (1b)$$

Herein, a 'diffraction grating' is defined as a plurality of features arranged to provide diffraction of light incident on the features. A 'directional diffraction grating' is a diffraction grating that provides diffraction selectively for light propagating in a predetermined or particular direction. Further by definition herein, the features of a diffraction grating are features formed one or both of in and on a surface of a material that supports propagation of light. The material may be a material of a light guide, for example. The features may include any of a variety of features or structures that diffract light including, but not limited to, grooves, ridges, holes and bumps on the material surface. For example, the diffraction grating may include a plurality of parallel grooves in the material surface. In another example, the diffraction grating may include a plurality of parallel ridges rising out of the material surface. A diffraction angle $\theta_m$ of light diffracted by a periodic diffraction grating may be given by equation (2) as:

$$\theta_m = \sin^{-1}\left(\frac{m\lambda}{d} - \sin\theta_i\right) \quad (2)$$

where $\lambda$ is a wavelength of the light, m is a diffraction order, d is a distance between features of the diffraction grating, and $\theta_i$ is an angle of incidence of the light on the diffraction grating.

In some examples, the plurality of features may be arranged in a periodic array. In some examples, the diffraction grating may include a plurality of features arranged in a one-dimensional (1-D) array. For example, a plurality of parallel grooves is a 1-D array. In other examples, the diffraction grating may be a two-dimensional (2-D) array of features. For example, the diffraction grating may be a 2-D array of bumps on a material surface. The features (e.g., grooves, ridges, holes, bumps, etc.) may have any of a variety of cross sectional shapes or profiles that provide diffraction including, but not limited to, one or more of a rectangular profile, a triangular profile and a saw tooth profile.

Herein, 'diffractive coupling' is defined as coupling of an electromagnetic wave (e.g., light) across a boundary between two materials as a result of diffraction (e.g., by a diffraction grating). For example, a diffraction grating may be used to couple out light propagating in a light guide by diffractive coupling across a boundary of the light guide. The diffractive coupling substantially overcomes total internal reflection that guides the light within the light guide to couple out the light, for example.

Further herein, a 'light guide' is defined as a structure that guides light within the structure using total internal reflection. In particular, the light guide may include a core that is substantially transparent at an operational wavelength of the light guide, according to some examples. In some examples, the term 'light guide' generally refers to a dielectric optical waveguide that provides total internal reflection to guide light at an interface between a dielectric material of the light guide and a material or medium that surrounds that light guide. For example, a refractive index of the light guide material may be greater than a refractive index of the surrounding medium to provide total internal reflection of the guided light. In some examples, the light guide may include a coating in addition to or instead of the aforementioned refractive index difference to provide the total internal reflection. The coating may be a reflective coating, for example. According to various examples, the light guide may be any of a variety of light guides including, but not limited to, a slab or plate optical waveguide guide.

Further herein, the term 'plate' when applied to a light guide as in a 'plate light guide' is defined to mean piecewise or differentially planar. In particular, a plate light guide is defined as a light guide configured to guide light in two substantially orthogonal directions bounded by a top surface and a bottom surface of the light guide. Further, by definition the top and bottom surfaces are both separated from one another and substantially parallel to one another in a differential sense. As such, within any differentially small region of the plate light guide, the top and bottom surfaces are substantially parallel or co-planar. In some examples, a plate light guide may be substantially flat (e.g., confined to a plane) and so the plate light guide is a planar light guide. In other examples, the plate light guide may be curved in one or two orthogonal dimensions. For example, the plate light guide may be curved in a single dimension to form a cylindrical shaped plate light guide. In various examples however, any curvature has a radius of curvature sufficiently large to insure that total internal reflection is maintained within the plate light guide to guide light.

Further still, as used herein, the article 'a' is intended to have its ordinary meaning in the patent arts, namely 'one or more'. For example, 'a reflector' means one or more reflectors and as such, 'the reflector' means 'the reflector(s)' herein. Also, any reference herein to 'vertical', 'horizontal', 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Figure 1B:
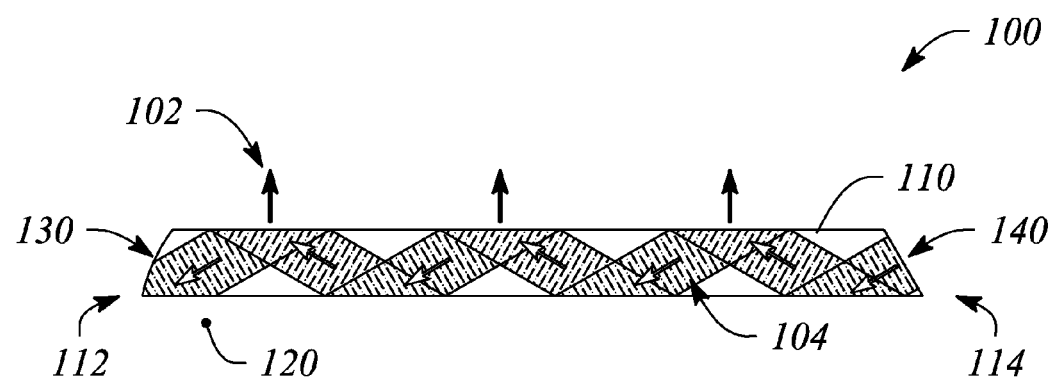
FIG. 1B illustrates another cross sectional view of a backlight, according to an example consistent with the principles described herein.
Figure 1C:
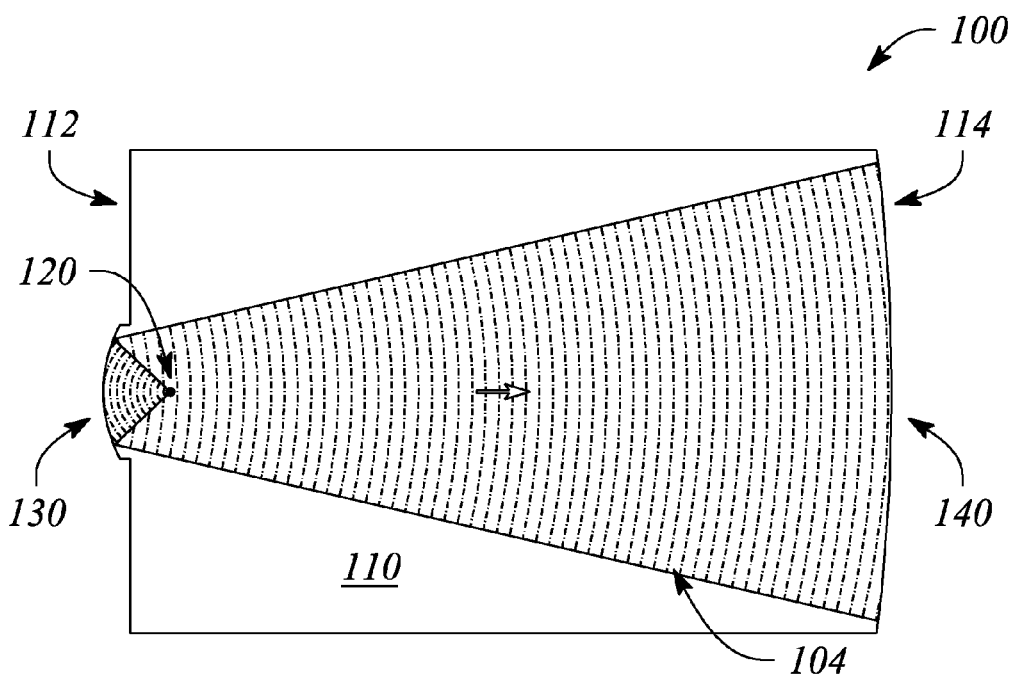
FIG. 1C illustrates a plan view of the backlight illustrated in FIG. 1A, according to an example consistent with the principles described herein.
Figure 1D:
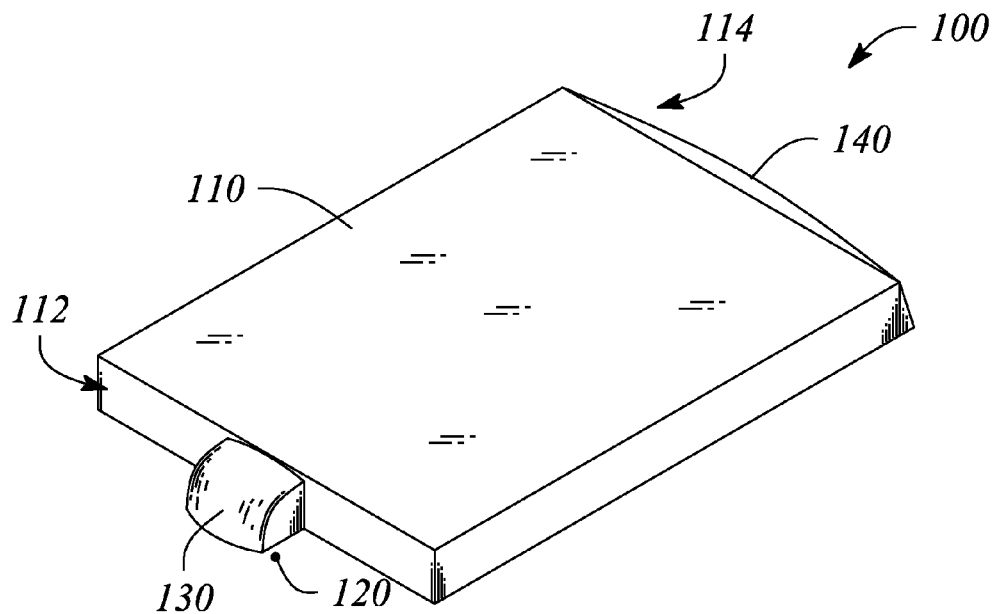
FIG. 1D illustrates a perspective view of the backlight illustrated in FIG. 1A, according to an example consistent with the principles described herein.

FIG. 1A illustrates a cross sectional view of a backlight 100, according to an example consistent with the principles described herein. FIG. 1B illustrates another cross sectional view of the backlight 100 illustrated in FIG. 1A, according to an example consistent with the principles described herein. In particular, FIG. 1A illustrates a portion of light guided in the backlight 100 that propagates from left to right and FIG. 1B illustrates another portion of light guided within the backlight 100 that generally propagates from right to left, as will be explained below. Arrows in FIGS. 1A and 1B depict specific propagation directions of the light guided within the backlight 100. FIG. 1C illustrates a plan view of the backlight 100 illustrated in FIG. 1A, according to an example consistent with the principles described herein. In particular, the plan view of FIG. 1C is a view from a top of the backlight 100 and depicts the portion of light that propagates from left to right, corresponding to FIG. 1A. FIG. 1D illustrates a perspective view of the backlight 100 illustrated in FIG. 1A, according to an example consistent with the principles described herein.

According to various examples, the backlight 100 is configured to emit light from a surface of the backlight 100. For example, the light may be emitted as emitted light 102 from a top surface, as illustrated in FIG. 1B. In some examples, the top surface of the backlight 100 may be a substantially planar surface. According to various examples, the emitted light 102 is a portion of light guided within the backlight (i.e., guided light 104). Specifically, the emitted light 102 is a portion of the guided light 104 that propagates from right to left, as illustrated in FIG. 1B.

According to some examples, the backlight 100 is to be used in an electronic display and the emitted light 102 represents or is used to form a plurality of pixels of the electronic display. The emitted light 102 may be directed in a direction corresponding to a viewing direction of the electronic display, for example. In some examples, the electronic display is a two-dimensional (2-D) electronic display. In other examples, the electronic display may be a so-called 'glasses free' three-dimensional (3-D) display (e.g., a multiview display).

In some examples, the emitted light 102 may be substantially omnidirectional in a region (e.g., half-volume) above the top surface of the backlight 100. The emitted light 102 may be emitted by scattering a portion of the guided light 104 within the backlight 100. The guided light 104 may be scattered at the top surface of the backlight 100 to produce the emitted light 102. Alternatively, scattering may take place within the backlight 100 or at a back or bottom surface of the backlight 100. In some examples, the emitted light 102 may be scattered using a diffuser (e.g., a prismatic diffuser) upon being or after being emitted from the top surface of the backlight 100. In some examples, the diffuser may provide further scattering of the emitted light 102.

In other examples, the emitted light 102 is emitted as a beam of light in a direction generally away from the backlight surface. The beam of emitted light 102 may be substantially directional as opposed to omnidirectional. In particular, the backlight 100 may be configured to produce a plurality of emitted light beams 102 (see FIG. 1B) that is emitted from the backlight surface toward an electronic display viewing direction, in some examples. Individual ones of the emitted light beams 102 may correspond to individual pixels of either the 2-D electronic display or the 3-D electronic display, in various examples. The emitted light beam 102 may have both a predetermined direction and a relatively narrow angular spread, according some examples.

In some examples, the emitted light beam 102 is configured to propagate away from the backlight 100 in a direction that is substantially perpendicular to the surface of the backlight 100. In some examples, the light beam 102 emitted by the backlight 100 may be substantially collimated, which may reduce cross coupling or 'cross-talk' between adjacent light beams. The reduced cross coupling may be particularly useful for 3-D display applications that are typically more sensitive to the effects of cross coupling, in some examples.

As illustrated in FIGS. 1A-1D, the backlight 100 includes a plate light guide 110. The plate light guide 110 is configured to guide light (e.g., from a light source 120). In some examples, the plate light guide 110 guides the guided light 104 using total internal reflection. The plate light guide 110 may include a dielectric material configured as an optical waveguide. The dielectric material may have a first refractive index that is greater than a second refractive index of a medium surrounding the dielectric optical waveguide. The difference in refractive indices may be configured to facilitate total internal reflection of the guided light 104 according to a guided mode of the plate light guide 110.

The plate light guide 110 may be a slab or plate optical waveguide that is an extended, substantially planar sheet of dielectric material (e.g., as illustrated in cross section in FIGS. 1A and 1B, and from the top in FIG. 1C). The substantially planar sheet of dielectric material is configured to guide the guided light 104 through total internal reflection. In some examples, the plate light guide 110 may include a cladding layer on a surface of the plate light guide 110 (not illustrated). The cladding layer may be used to further facilitate total internal reflection. In some examples, the guided light 104 that is guided in the plate light guide 110 may propagate along or across an entire length of the plate light guide 110. According to various examples, the plate light guide 110 may include or be made up of any of a variety of dielectric materials including, but not limited to, various types of glass (e.g., silica glass) and transparent plastics (e.g., acrylic).

As further illustrated in FIGS. 1A and 1B, the guided light 104 propagates along the plate light guide 110 in a generally horizontal direction. Propagation of the guided light 104 is illustrated in FIGS. 1A and 1B as a crosshatched region representing a propagating guided light 104 within the light guide 110. Similar crosshatching is employed in FIG. 1C to illustrate the propagation of the FIG. 1A portion of guided light 104 as viewed from the top. The propagating guided light 104 illustrated in FIGS. 1A and 1B may represent optical waves of propagating light associated with the optical mode of the light guide 110. The guided light 104 is further illustrated in FIG. 1B as 'bouncing' or reflecting off of top and bottom walls or surfaces of the light guide 110 at an interface between the material (e.g., dielectric) of the light guide 110 and the surrounding medium to represent total internal reflection responsible for guiding the guided light 104.

According to various examples, the backlight 100 further includes a light source 120 to produce light. In various examples, the light source 120 may be substantially any source of light including, but not limited to, one or more of a light emitting diode (LED), a fluorescent light and a laser. The light source 120 may include an LED at or in a vicinity of an edge of the plate light guide 110. In some examples, a single LED near the edge of the plate light guide 110 may be employed.

According to some examples, the light source 120 may produce a substantially monochromatic light having a narrowband spectrum denoted by a particular color. In particular, the color of the monochromatic light may be a primary color of a particular color gamut or color model (e.g., a red-green-blue (RGB) color model). For example, the light source 120 may include a red LED such that the monochromatic light is substantially red light. In another example, the light source 120 may include a green LED such that the monochromatic light produced is substantially green in color. In yet another example, the light source 120 may include a blue LED such that the monochromatic light is substantially blue in color.

In other examples, light provided by the light source 120 has a substantially broadband spectrum. For example, the light produced by the light source 120 may be white light. The light source 120 may be a fluorescent light that produces white light. In another example, a plurality of different colored lights may be combined to provide the white light. For example, the light source 120 may be made up of a combination of a red LED, a green LED and blue LED that together represent a broad spectrum, substantially white light source 120.

According to various examples, the backlight 100 illustrated in FIGS. 1A-1D further includes a first collimating reflector 130 located at a first edge 112 of the plate light guide 110. The first collimating reflector 130 is configured to collimate the light produced by the light source 120, according to various examples. In particular, the first collimating reflector 130 may be configured to collimate light in a vertical direction, according to some examples. Herein, the vertical direction is defined as being substantially orthogonal to a surface (e.g., the top surface or a bottom surface) of the plate light guide 110. Further, as illustrated in FIG. 1A, the collimating reflector 130 is configured to reflect or direct the collimated light into the plate light guide 110, according to various examples. As illustrated, the collimated light directed by the first collimating reflector 130 into the plate light guide 110 is the guided light 104 traveling from left to right. In some examples, the first collimating reflector 130 at the first edge 112 is configured to direct the collimated light into the plate light guide 110 substantially parallel with a surface (e.g., top surface) of the plate light guide 110. FIG. 1A illustrates the collimated light (i.e., guided light 104 propagating from left to right) being substantially parallel to the top surface of the plate light guide 110.

In some examples, the first collimating reflector 130 is further configured to produce light that diverges in the horizontal direction as a diverging beam of guided light 104. In particular, the light exiting the first collimated reflector 130 is not collimated in the horizontal direction, but is instead a diverging beam of guided light 104. The diverging beam of guided light 104 is illustrated in FIG. 1C. In various examples, the diverging beam of guided light 104 may appear to be diverging from a virtual point source when viewed in the horizontal direction, according to some examples. In other words, an origin of the light divergences is located as a predetermined point.

According to various examples, the backlight 100 further includes a second collimating reflector 140 located at a second edge 114 of the plate light guide 110. The second edge 114 may be opposite the first edge 112 across the plate light guide 110, as illustrated. The second collimating reflector 140 is configured to further collimate the collimated light in the horizontal direction. In particular, the second collimating reflector 140 receives the guided light 104 propagating in the plate light guide 110. The received guided light 104 is collimated in the vertical direction. The second collimating reflector 140 then further collimates the guided light 104 in the horizontal direction, according to various examples. Further, according to various examples, the second collimating reflector 140 is configured to reflect or redirect the further collimated light back into the plate light guide 110.

In some examples, the second collimating reflector 140 is configured to redirect the further collimated light back into the plate light guide 110 at a non-zero angle. In particular, the second collimating reflector 140 may be tilted or canted relative to a plane or surface of the plate light guide 110 to redirect the further collimated light at the non-zero angle.

The second collimating reflector 140 may be tilted or canted to redirect the collimated light at an angle $\theta$ relative to a top surface and a bottom surface of the plate light guide 110. In various examples, the angle $\theta$ may be both greater than zero and less than a critical angle of total internal reflection within the plate light guide 110. If the critical angle is about 45 degrees, the angle $\theta$ may be between about 1 degree and about 40 degrees. In another example, the angle $\theta$ may be between about 10 degrees and 35 degrees. For example, the angle $\theta$ may be about 30 degrees. The angle $\theta$ may cause the redirected, further collimated light to reflect off the top and bottom surfaces of the plate light guide 110 due to total internal reflection, as illustrated in FIG. 1B.

In some examples, the first collimating reflector 130 may be a shaped reflector. In particular, the first collimating reflector 130 may have a shape that is configured to collimate light produced by the light source 120 in the vertical direction, according to some examples. In some examples, the shape of the first collimating reflector 130 represents a singly curved surface. For example, the first collimating reflector 130 may be a portion of a parabolic cylinder. In other examples, the first collimating reflector 130 includes a shape in the vertical direction to produce the collimated guided light 104 illustrated in FIG. 1A and another shape in the horizontal direction that is configured to produce the diverging beam of guided light 104 illustrated in FIG. 1C.

The light source 102 (e.g., an LED) may be located at or near a focus of the first collimating reflector 130 (i.e., a focal point of the collimating reflector 130). Light diverging from the light source 102 may be collected and redirected or reflected by the first collimating reflector 130 as a collimated beam of light in the vertical direction. In some examples, the collimating reflector 130 may be employed in a so-called offset feed configuration. According to some examples, the first collimating reflector 130 may have a surface defined by equation (1a) above, for example, where the origin of light divergence (e.g., the location of the virtual point source) is at coordinates $(x_0, z_0)$.

In some examples, the second collimating reflector 140 also may have a curved or shaped surface (i.e., be a shaped reflector), albeit in the horizontal direction only. In particular, the shaped second collimating reflector 140 may have a shape in a horizontal plane to further collimate light received from the plate light guide 110 in the horizontal direction. In some examples, the shape of the second collimating reflector 140 represents a singly curved parabolic surface (e.g., a portion of a parabolic cylinder). In addition, the second collimating reflector 140 may have a substantially flat surface in the vertical direction, according to various examples.

In some examples, a focus of the shaped second collimating reflector 140 (i.e., a focal point of the second collimating reflector 140) may be located at the origin of the light divergence of the first collimating reflector 130. For example, the focal point of the shaped second collimating reflector 140 may be located at coordinates $(x_0, z_0)$. Further, the substantially flat vertical surface of the second collimating reflector 140 may be tilted to the non-zero angle to redirect the further collimated light exiting the second collimating reflector 140 at an angle θ, according to various examples.

In some examples (e.g., as illustrated in FIGS. 1B and 1D), the second collimating reflector 140 may be employed in a so-called center-feed configuration. In other examples (not illustrated), the second collimating reflector 140 may be employed in a so-called offset feed configuration. In some examples, a surface of the second collimating reflector 140 is given by equation (1b) with the coordinates $(x_0, z_0)$ representing the focal point.

Figure 2A:
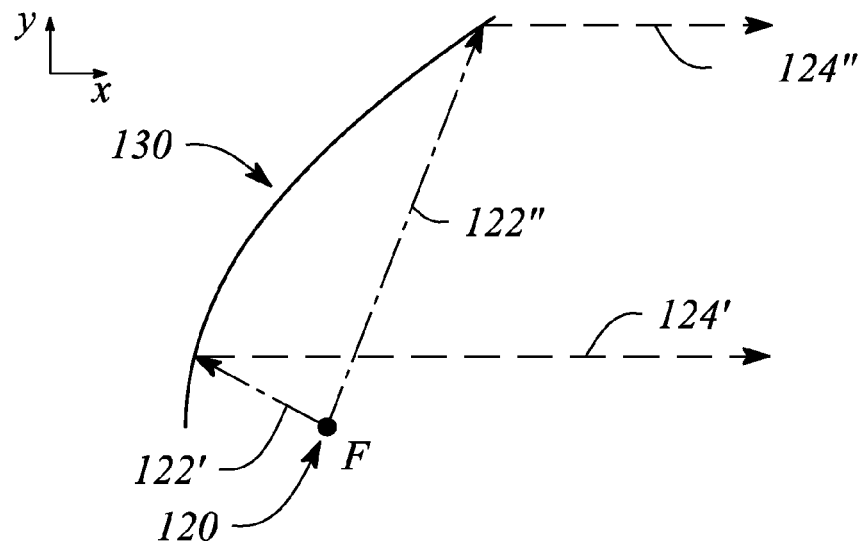
FIG. 2A illustrates a schematic representation of a shaped first collimating reflector in a vertical plane, according to an example consistent with the principles described herein.
Figure 2B:
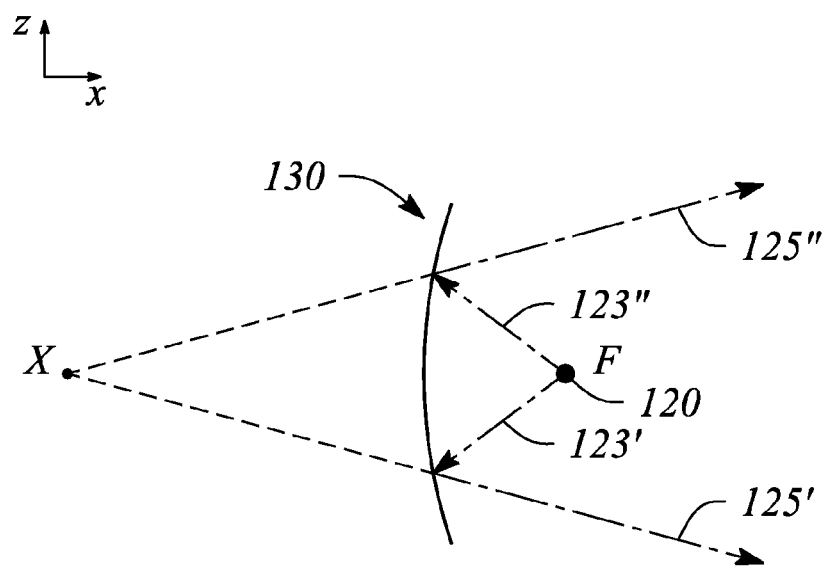
FIG. 2B illustrates a schematic representation of the shaped first collimating reflector of FIG. 2A in a horizontal plane, according to an example consistent with the principles described herein.

FIG. 2A illustrates a schematic representation of a shaped first collimating reflector 130 in a vertical plane (e.g., x-y plane), according to an example consistent with the principles described herein. FIG. 2B illustrates a schematic representation of the shaped first collimating reflector 130 of FIG. 2A in a horizontal plane (e.g., x-z plane), according to an example consistent with the principles described herein. As illustrated, the vertical plane and the horizontal plane pass through a focal point F of the shaped collimating reflector 130. Further, FIG. 2A illustrates the shaped collimating reflector 130 in an offset feed configuration with respect to a light source 120 located at the focal point F, while FIG. 2B illustrates a center feed configuration in the horizontal plane.

In FIG. 2A, light incident from the light source 120 illuminates a portion of the first collimating reflector 130 in the vertical plane, as illustrated. The incident light is denoted by light rays 122', 122" in FIG. 2A. The first collimating reflector 130 reflects the incident light to produce light rays 124', 124" in the vertical plane, as illustrated. In particular, the light rays 124', 124" illustrated in FIG. 2A represent reflected light that is collimated in the vertical direction by the first collimating reflector 130.

The FIG. 2B illustrates light rays 123', 123" of incident light from the light source 120 in the horizontal plane. The light reflected by the first collimating reflector 130 in the horizontal plane is illustrated by the light rays 125', 125". As illustrated, the light rays 125', 125" diverge upon exiting the first collimating reflector 130 (i.e., are not collimated in the horizontal plane). In particular, the diverging light rays 125', 125" appear to be diverging from a virtual point source located at X=$(x_0, z_0)$, as illustrated.

Figure 2C:
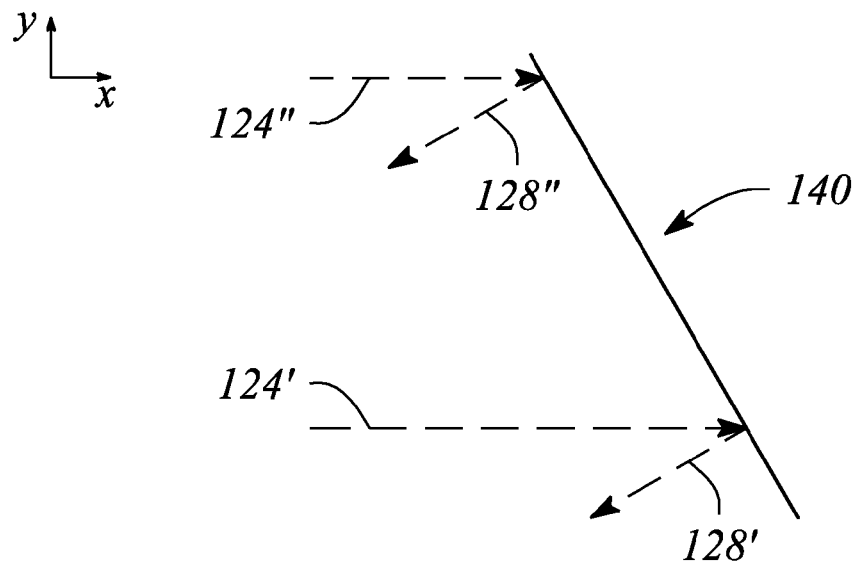
FIG. 2C illustrates a schematic representation of a shaped second collimating reflector in a vertical plane, according to an example consistent with the principles described herein.
Figure 2D:
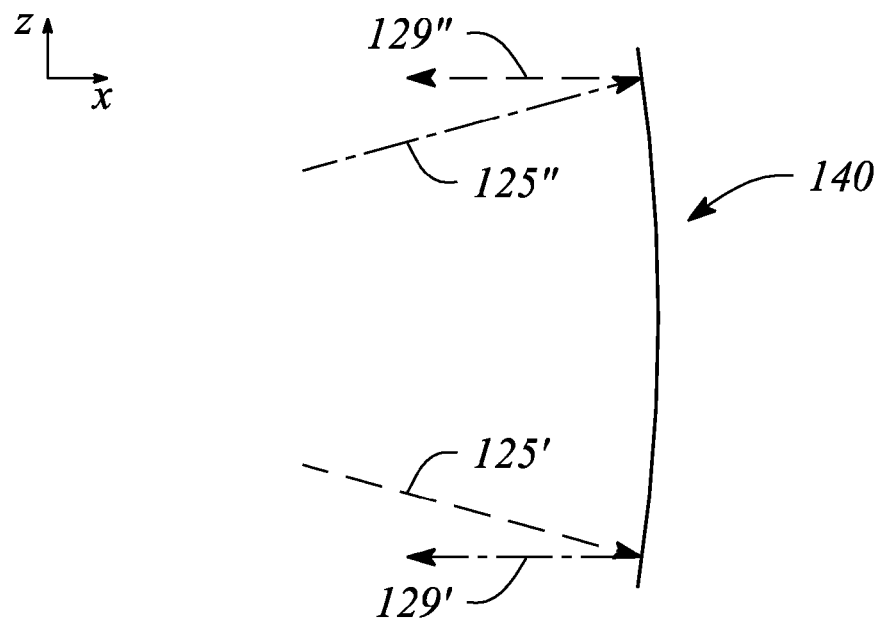
FIG. 2D illustrates a schematic representation of the shaped second collimating reflector of FIG. 2C in a horizontal plane, according to an example consistent with the principles described herein.

FIG. 2C illustrates a schematic representation of the shaped second collimating reflector 140 in a vertical plane (e.g., x-y plane), according to an example consistent with the principles described herein. FIG. 2D illustrates a schematic representation of the shaped second collimating reflector 140 of FIG. 2C in a horizontal plane (e.g., x-z plane), according to an example consistent with the principles described herein. In particular, as illustrated in FIGS. 2C and 2D, the second collimating reflector 140 has a shape only in the horizontal direction. In the vertical direction, the second collimating reflector 140 is represented in cross section by a straight or linear reflective surface that is sloped to redirect light rays 124', 124" at a non-zero angle downward as light rays 128', 128", as illustrated in FIG. 2C. Light rays 128', 128" reflected by the second collimating reflector 140 remain collimated in the vertical direction.

FIG. 2D illustrates the diverging light rays 125', 125" being reflected by the shaped second collimating reflector 140 to produce light rays 129', 129". Moreover, the light rays 129', 129" are collimated in the horizontal direction by the shaped second collimating reflector 140. In particular, since the diverging light rays 125', 125" are configured to be diverging from a point coincident with the focal point of the shaped second collimating reflector 140, the light rays 129', 129" exit the second collimating reflector 140 collimated in the horizontal direction.

Referring again to FIGS. 1A-1C, according to some examples of the backlight 100, one or both of the first collimating reflector 130 and the second collimating reflector 140 may be integral to the plate light guide 110. In particular, one or both of the first and second collimating reflectors 130, 140 may not be substantially separable from the plate light guide 110, according to some examples. In some examples, the integral first collimating reflector 130 may be formed from a material of the plate light guide 110. In some examples, the integral second collimating reflector 140 may be formed from a material of the plate light guide 110. For example, the integral first collimating reflector 130, integral second collimating reflector 140, and the plate light guide 110 may be formed by injection molding a material that is continuous between the plate light guide 110 and the first and second collimating reflectors 130, 140 located at the edges of the plate light guide 110. The material of the first and second collimating reflectors 130, 140 as well as the plate light guide 110 may be injection-molded acrylic.

According to some examples, one or both of the first and second collimating reflectors 130, 140 may further include a reflective coating on the shaped (curved) surface of the material used to form the collimating reflectors 130, 140. A metallic coating (e.g., an aluminum film) or a similar 'mirroring' material may be applied to an outside surface of a curved portion of the material that forms the collimating reflectors 130, 140 to enhance a reflectivity of the surface. In examples that include one or both of the first and second collimating reflectors 130, 140 being integral to the plate light guide 110, the backlight 100 may be referred to as a 'monolithic' backlight 100, herein.

In some examples, the backlight 100 may include a plurality of first and second collimating reflectors 130, 140 at a similar plurality of opposing edges of the plate light guide 110. For example, three different colored light sources 120 may be located on three different edges of the plate light guide 110 to illuminated three separate first collimated reflectors 130. Three separate second collimating reflectors 140 may be located at opposing edges to the edges where the first collimating reflectors 130 are located to receive and further collimate the collimated light of the three different colored light sources 120.

Figure 3:
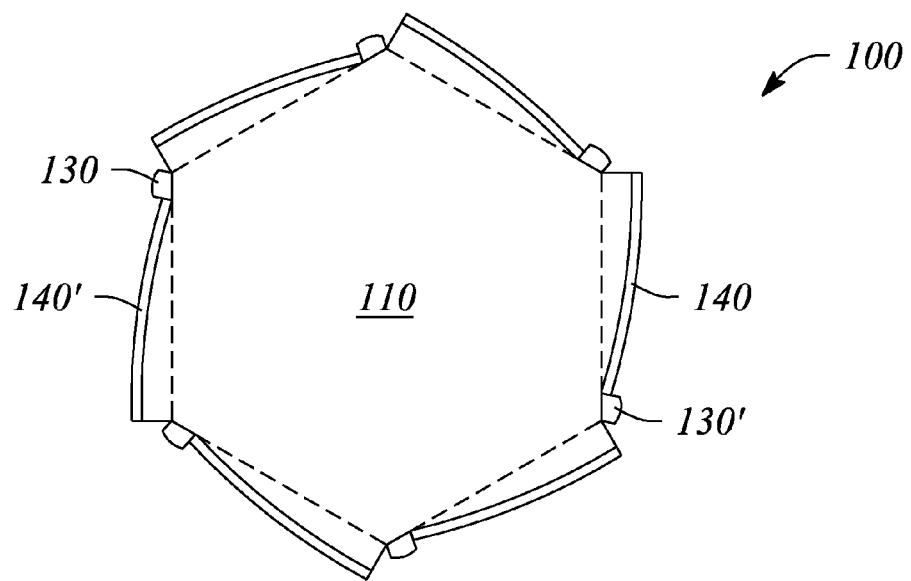
FIG. 3 illustrates a top view of a backlight that includes a plurality of pairs of first and second collimating reflectors, according to an example consistent with the principles described herein.

FIG. 3 illustrates a top view of a backlight 100 that includes a plurality of pairs of first and second collimating reflectors 130, 140, according to an example consistent with the principles described herein. In particular, FIG. 3 illustrates a substantially hexagonal backlight 100 that includes a first collimating reflector 130 and a second collimating reflector 140 on each of six edges of a substantially hexagonal shaped plate light guide 110. For the purpose of identifying the pairs of the first and second collimating reflectors 130, 140 in FIG. 3, a first pair of first and second collimating reflectors 130, 140 is disposed on a first pair of opposing edges of the plate light guide 110. A second pair of first and second collimating reflectors 130', 140' are disposed on the same pair of opposing edges of the plate light guide 110, as illustrated. In other words, each member of a pair of reflectors (e.g., '130, 140'; '130', 140'') is across the plate light guide 110 from the other member of the pair on opposing edges. Moreover, each edge of the plate light guide 110 includes a first collimating reflector 130 and a second collimating reflector 140 from two opposing pairs. Moreover, a light source or sources (not illustrated) may be located below each of the first collimating reflectors 130 and the light sources are generally hidden from this FIG. 3 view.

According to some examples, the backlight 100 further includes a lens between the light source 120 and the first collimating reflector 130. In some examples, the lens is a negative lens. The negative lens may be employed to increase a divergence of light emitted by the light source 120. Increasing the light divergence may allow the light source 120 to be positioned closer to the collimating reflector 130. In other examples, the lens may be a positive lens. A positive lens may be used to partially or completely collimate light from the light source 120 in one or both of the first collimation direction and the second collimation direction (e.g., corresponding to the vertical and horizontal directions). Partial collimation using the lens may facilitate realizing either or both of the first collimating reflector 130 and the second collimating reflector 140 by reducing an amount of collimation that is to be provided by the collimating reflectors 130, 140. In yet other examples, the lens may be an aspheric lens.

Figure 4:
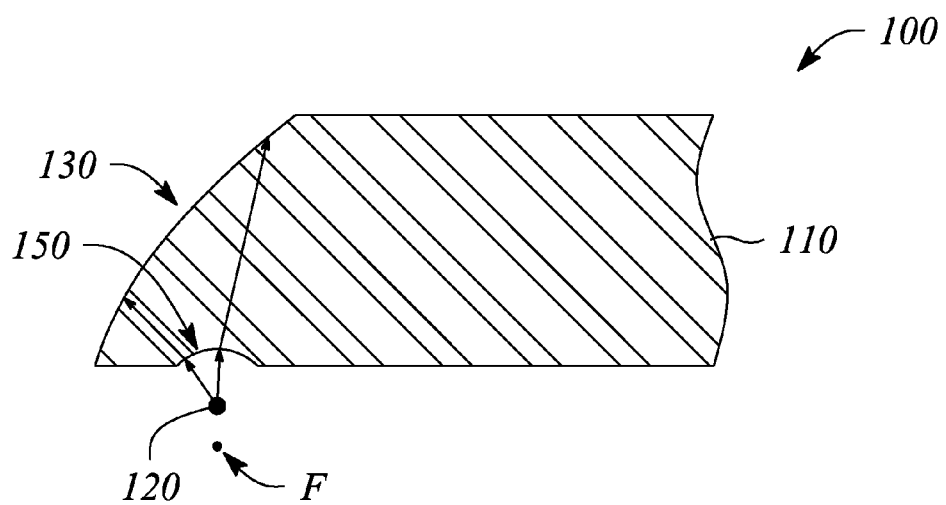
FIG. 4 illustrates a cross sectional view of a lens between a collimating reflector and a light source, according to an example consistent with the principles described herein.

FIG. 4 illustrates a cross sectional view of a lens 150 between the collimating reflector 130 and the light source 120, according to an example consistent with the principles described herein. As illustrated, the lens 150 represents a cylindrical single surface, negative lens 150. The divergence provided by the presence of the negative lens 150 allows the light source 120 to be located closer to the first collimating reflector 130 than without the negative lens 150. In other examples, the lens 150 is a positive lens (not illustrated), as mentioned above.

In some examples, the lens 150 may be integral to the plate light guide 110. In some examples, the integral lens 150 may be formed from a material of plate light guide 110. For example, both of the integral lens 150 and the plate light guide 110 may be formed by injection molding a material that is continuous between the lens 150 and the plate light guide 110. The material of both of the lens 150 and the plate light guide 110 may be injection-molded acrylic, for example. FIG. 4 illustrates the lens 150 as an integral lens 150 as well as the integral first collimating reflector 130.

Figure 5:
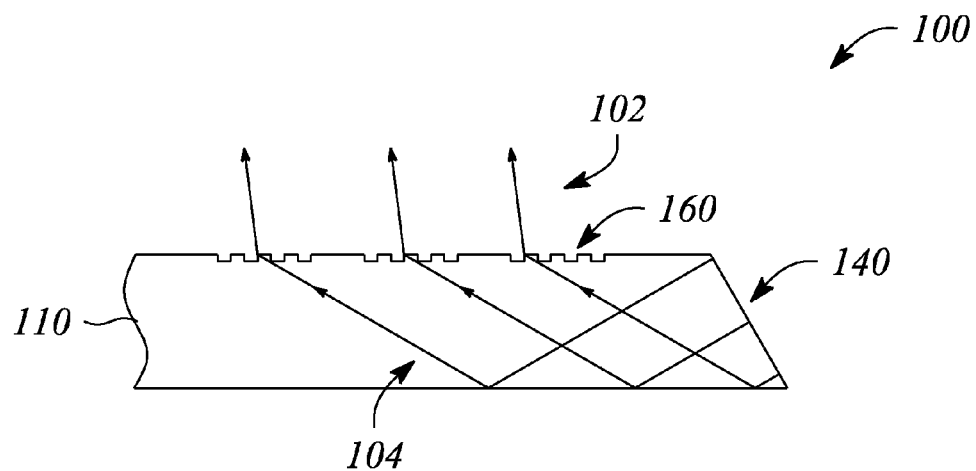
FIG. 5 illustrates a cross sectional view of a backlight including a diffraction grating, according to an example consistent with the principles described herein.

According to some examples, the backlight 100 may further include a diffraction grating. When included, the diffraction grating may be configured to couple out a portion of the guided light 104 from the plate light guide 110 by diffractive coupling. According to various examples, diffractive coupling couples out a portion of the guided light 104 in a direction that is different from a general direction of propagation in the plate light guide 110. The coupled out portion of the guided light 104 may be directed away from a surface of the plate light guide 110 at a diffraction angle relative to the plate light guide 110. The diffraction angle may be between 60 and 120 degrees, for example. In some examples, the diffraction angle may be about 90 degrees (i.e., normal to a surface of the plate light guide 110). FIG. 5 illustrates a cross sectional view of a portion of the backlight 100 including a diffraction grating 160, according to an example consistent with the principles described herein. As illustrated, the coupled out portion of the guided light 104 is the emitted light 102.

According to various examples, the diffraction grating 160 is located at a surface of the plate light guide 110. In particular, the diffraction grating 160 may be formed in a surface of the plate light guide 110, in some examples. For example, the diffraction grating 160 may include a plurality of grooves or ridges that either penetrate into or extend from, respectively, the surface of the plate light guide 110. The grooves may be milled or molded into the surface, for example. As such, a material of the diffraction grating 160 may be a material of the plate light guide 110, according to some examples. As illustrated in FIG. 5, the diffraction grating 160 includes parallel grooves that penetrate the surface of the light guide 110. In other examples (not illustrated), the diffraction grating 160 may be a film or layer applied or affixed to the light guide surface. In some examples, the grooves or ridges are substantially perpendicular to a propagation direction of the guided light 104 in the plate light guide 110. In other examples, the grooves or ridges may be oriented on the surface of the light guide at slant to the propagation direction (e.g., an angle other than perpendicular).

In some examples, the backlight 100 is substantially transparent. In particular, the plate light guide 110 and any diffraction grating 160 on a surface of the plate light guide 110 may be optically transparent in a direction orthogonal to a direction of guided light propagation within the plate light guide 110, according to some examples. Optical transparency may allow objects on one side of the backlight 100 to be seen from an opposite side.

Figure 6:
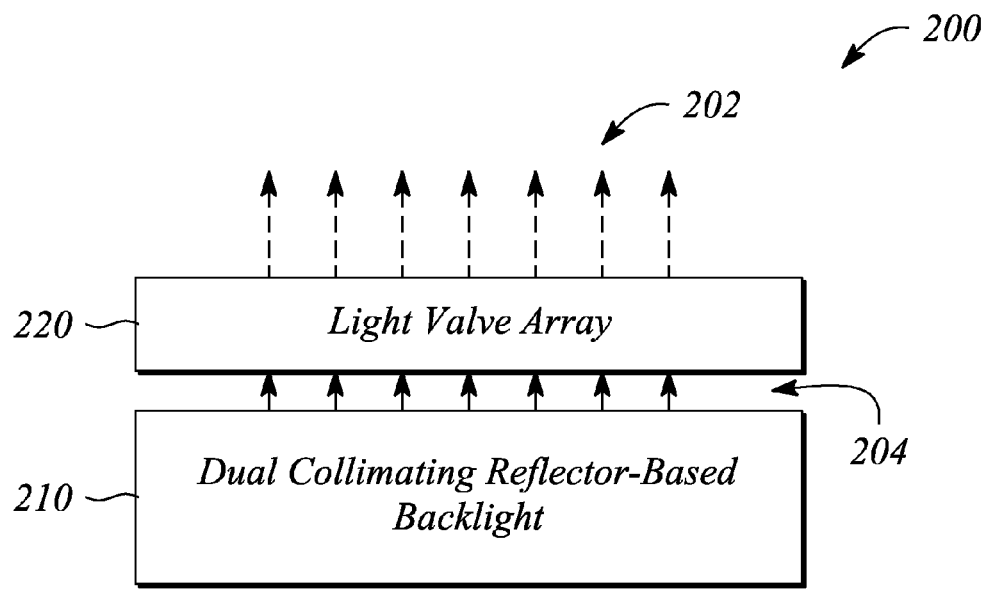
FIG. 6 illustrates a block diagram of an electronic display, according to an example consistent with the principles described herein.

According to some examples of the principles described herein, an electronic display is provided. FIG. 6 illustrates a block diagram of an electronic display 200, according to an example consistent with the principles described herein. In particular, the electronic display 200 illustrated FIG. 6 may be either a two-dimensional (2-D) electronic display or a three-dimensional (3-D) electronic display. According to various examples, the electronic display 200 is configured to emit modulated light beams 202 that serve as pixels of the electronic display 200. Further, in various examples, the emitted light beams 202 may be preferentially directed toward a viewing direction of the electronic display 200.

The electronic display 200 illustrated in FIG. 6 includes a dual collimating reflector-based backlight 210. According to various examples, the dual collimating reflector-based backlight 210 serves as a source of light for the electronic display 200. Further, the dual collimating reflector-based backlight 210 serves as a source of color for the electronic display 200, in some examples. In particular, some of the emitted light beams 202 from the electronic display 200 may have a different color than other emitted light beams 202, according to some examples. According to various examples, the dual collimating reflector-based backlight 210 may be substantially similar to the backlight 100, described above.

In particular, according to some examples, the dual collimating reflector-based backlight 210 includes a light guide. The light guide may be substantially similar to the plate light guide 110 described above with respect to the backlight 100, in some examples. For example, the light guide of the dual collimating reflector-based backlight 210 may comprise a sheet of dielectric material. Further, the dual collimating reflector-based backlight 210 includes a first collimating reflector at a first edge of the light guide and a second collimating reflector at a second edge of the light guide. In various examples, the first collimating reflector is configured to collimate light produced by a light source in a first or vertical direction and to direct the collimated light into the light guide. Further, the second collimating reflector is configured to further collimate the collimated light in a second or horizontal direction and to redirect the further collimated light back into the light guide at a non-zero angle relative to a surface of the light guide. According to some examples, the first collimating reflector may be substantially similar to the first collimating reflector 130 described above with respect to the backlight 100. Similarly, the second collimating reflector may be substantially similar to the second collimating reflector 140 described above with respect to the backlight 100, according to some examples.

In some examples, the dual collimating reflector-based backlight 210 further includes a plurality of diffraction gratings at the top surface of the plate light guide. The diffraction gratings are configured to diffractively couple out different portions of the collimated light guided within the plate light guide as a corresponding plurality of light beams 204. In some examples, a diffraction grating of the plurality is substantially similar to the diffraction grating 160 described above with respect to the backlight 100. Moreover, the light beams 204 produced by the diffraction gratings through diffractive coupling may correspond to the emitted light 102 described above with respect to the backlight 100.

In some examples, the dual collimating reflector-based backlight 210 further includes the light source. According to some examples, the light source is substantially similar to the light source 120 described above with respect to the backlight 100. In particular, the light source may include a light emitting diodes (LEDs) arranged at an edge of the plate light guide in a vicinity of a focal point of the first collimating reflector.

Referring again to FIG. 6, the electronic display 200 further includes a light valve array 220, according to various examples. The light valve array 220 includes a plurality of light valves configured to modulate the light beams 204 from the dual collimating reflector-based backlight 210 as emitted light 202, according to various examples. In various examples, different types of light valves may be employed in the light valve array 220 including, but not limited to, liquid crystal light valves and electrophoretic light valves.

Figure 7:
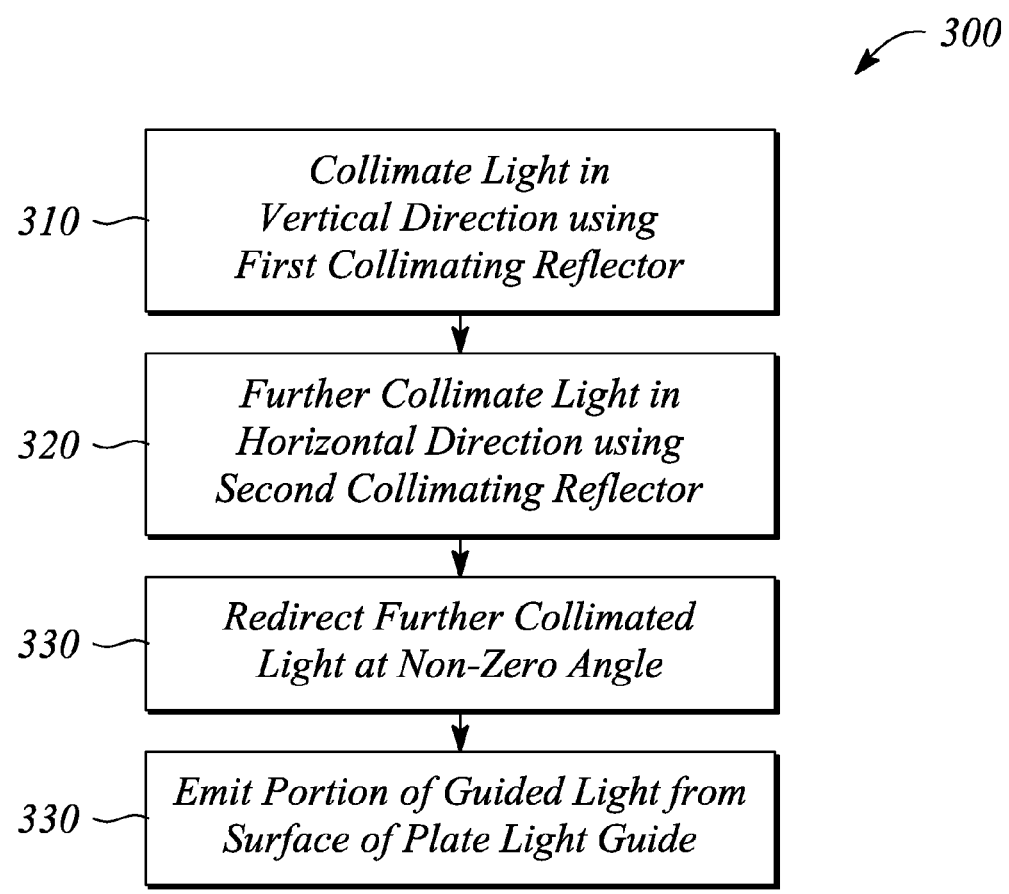
FIG. 7 illustrates a flow chart of a method of backlighting, according to an example consistent with the principles described herein.

Further according to the principles described herein, a method of backlighting is provided. FIG. 7 illustrates a flow chart of a method 300 of backlighting, according to an example consistent with the principles described herein. As illustrated, the method 300 of backlighting includes collimating 310 light in a vertical direction using a first collimating reflector located at a first edge of a plate light guide. According to various examples, the light is provided by a light source and the collimated light is directed into and guided in the plate light guide. In some examples, the first collimating reflector used in collimating 310 light may be substantially similar to the first collimating reflector 130; the plate light guide may be substantially similar to the plate light guide 110; and the light source may be substantially similar to the light source 120, all described above with respect to the backlight 100. For example, the plate light guide may be a substantially planar dielectric optical waveguide (e.g., a sheet of dielectric material).

The method 300 of backlighting further includes further collimating 320 the collimated light guided by the plate light guide in a horizontal direction. Further collimating 320 the collimated guided light uses a second collimating reflector at a second edge of the plate light guide, according to various examples. The second edge is substantially opposite to the first edge, for example. In some examples, the second collimating reflector is substantially similar to the second collimating reflector 140 described above with respect to the backlight 100.

The method 300 of backlighting further includes redirecting 330 the further collimated light back into the plate light guide. In particular, the further collimated light is redirected 330 into the plate light guide at a non-zero angle relative to a surface of the plate light guide. The non-zero angle is less than a critical angle to provide total internal reflection of the collimated light within the plate light guide, according to various examples. As such, the further collimated light redirected 330 into the plate light guide at the non-zero angle is guided by the plate light guide. The non-zero angle may be provided by tilting the second collimating reflector.

The method 300 of backlighting further includes emitting 330 a portion of the redirected, further collimated guided light from the surface (e.g., top surface) of the plate light guide. In some examples, emitting 330 a portion of the redirected, further collimated guided light is provided by diffractively coupling out the portion thereof using a diffraction grating. According to various examples, the diffraction grating is substantially similar to the diffraction grating 160 described above with respect to the backlight 100.

In some examples, one or both of the first collimating reflector and the second collimating reflector used in collimating 310 light and further collimating 320 the light, respectively, are shaped reflectors. In some examples, the shaped reflector of the first collimating reflector includes a first shape to collimate light in a vertical direction. In some examples, the shaped reflector of the second collimating reflector includes a second shape to collimate light in a second direction. In some examples, one or both of the first collimating reflector and the second collimating reflector are integral to and formed from a material of the plate light guide.

Thus, there have been described examples of a backlight, an electronic display and a method of operating a backlight that employ a pair of collimating reflectors to collimate and direct light into a plate light guide. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A backlight comprising:
    a plate light guide to guide light;
    a light source to produce light;
    a first collimating reflector at a first edge of the plate light guide to collimate the light from the light source in a vertical direction and to direct the collimated light into the plate light guide; and
    a second collimating reflector at a second edge of the plate light guide to further collimate the collimated light in a horizontal direction and to redirect the further collimated light back into the plate light guide,
    wherein the backlight is to emit a portion of the further collimated light as emitted light from a surface of the backlight.

2. The backlight of claim 1, wherein the plate light guide comprises a sheet of dielectric material to guide light by total internal reflection.

3. The backlight of claim 1, wherein the first collimating reflector is to direct the vertically collimated light into the plate light guide substantially parallel with the surface of the plate light guide, the collimated light having a portion that diverges in the horizontal direction, an origin of the light divergence being located at a focal point of the second collimating reflector.

4. The backlight of claim 1, wherein the second collimating reflector is tilted relative to the surface of the plate light guide to redirect the further collimated light at an angle θ relative to the surface, the angle θ being both greater than zero and less than a critical angle of total internal reflection within the plate light guide.

5. The backlight of claim 1, wherein the first collimating reflector has a first shape to collimate the light produced by the light source in the vertical direction, and wherein the second collimating reflector has a second shape to further collimate the collimated light in the horizontal direction.

6. The backlight of claim 1, wherein one or both of the first collimating reflector and the second collimating reflector is integral to and formed from a material of the plate light guide.

7. The backlight of claim 1, further comprising a lens between the light source and the first collimating reflector, the lens being integral to and formed from a material of the plate light guide.

8. The backlight of claim 1, further comprising a diffraction grating at the surface of the plate light guide, the diffraction grating to diffractively couple from the plate light guide a portion of the further collimated light redirected into the plate light guide by the second collimating reflector to produce the emitted light of the backlight.

9. An electronic display comprising the backlight of claim 1, wherein the emitted light of the backlight is light corresponding to a pixel of the electronic display.

10. An electronic display comprising:
    a dual collimating reflector-based backlight comprising:
        a light guide comprising a sheet of dielectric material;
        a first collimating reflector at a first edge of the light guide to collimate light produced by a light source in a vertical direction and to direct the collimated light into the light guide; and
        a second collimating reflector at a second edge of the light guide to further collimate the collimated light in a horizontal direction and to redirect the further collimated light back into the light guide at a non-zero angle relative to a surface of the light guide; and
    a light valve array to modulate light emitted from the surface of the light guide, the modulated light representing pixels of the electronic display.

11. The electronic display of claim 10, further comprising a plurality of diffraction gratings at the surface of the light guide, the diffraction gratings to diffractively couple out portions of the further collimated light as the emitted light.

12. The electronic display of claim 10, wherein the one or both of the first collimating reflector and the second collimating reflector are integral to and formed from the dielectric material of the light guide, the first collimating reflector comprising a first shape to collimate light in the vertical direction, the second collimating reflector comprising a second shape to collimate light in the horizontal direction, the second collimating reflector being tilted relative to the light guide to redirect the further collimated light at the non-zero angle.

13. The electronic display of claim 10, wherein the light valve array comprises an array of liquid crystal light valves, the electronic display being a three-dimensional (3-D) backlit liquid crystal display (LCD).

14. A method of backlighting, the method comprising:
    collimating light in a vertical direction using a first collimating reflector located at a first edge of a plate light guide, the light being provided by a light source and the collimated light being directed into and guided in the plate light guide;
    further collimating the collimated light guided by the plate light guide in a horizontal direction using a second collimating reflector at a second edge of the plate light guide;
    redirecting the further collimated light back into the plate light guide at a non-zero angle relative to a surface of the plate light guide; and
    emitting a portion of the redirected further collimated light from the surface of the plate light guide.

15. The method of backlighting of claim 14, wherein the first collimating reflector comprises a first shape to collimate light in the vertical direction and the second collimating reflector comprises a second shape to collimate light in horizontal direction, one or both of the first and second collimating reflectors being integral to and formed from a material of the plate light guide.

* * * * *